United States Patent
Yuasa

[11] Patent Number: 6,098,001
[45] Date of Patent: Aug. 1, 2000

[54] APPARATUS FOR CONTROLLING A CONTINUOUSLY VARIABLE TRANSMISSION AND METHOD THEREOF

[75] Inventor: Hiroyuki Yuasa, Atsugi, Japan

[73] Assignee: Unisia Jecs Corporation, Atsugi, Japan

[21] Appl. No.: 08/892,237

[22] Filed: Jul. 14, 1997

[30] Foreign Application Priority Data

Aug. 5, 1996 [JP] Japan .................................. 8-205929

[51] Int. Cl.$^7$ .................................................. F16H 59/00
[52] U.S. Cl. ............................... 701/51; 701/55; 477/46
[58] Field of Search ................................ 701/51, 54, 55, 701/56, 61; 477/44, 46, 48, 50; 474/17, 18

[56] References Cited

U.S. PATENT DOCUMENTS

| | | | |
|---|---|---|---|
| 5,042,326 | 8/1991 | Hibi et al. | 74/866 |
| 5,063,816 | 11/1991 | Soga et al. | 74/868 |
| 5,790,968 | 8/1998 | Kashiwabara et al. | 701/51 |
| 5,842,948 | 12/1998 | Yuasa et al. | 477/48 |

FOREIGN PATENT DOCUMENTS

62-149526  7/1987  Japan .
8-74958    3/1996  Japan .

*Primary Examiner*—Tan Nguyen
*Assistant Examiner*—Dalena Tran
*Attorney, Agent, or Firm*—Foley & Lardner

[57] ABSTRACT

A basic speed change ratio of a continuously variable transmission is set depending on operation conditions, a target speed change ratio that follows the basic speed change ratio at a predetermined rate of changing the speed is obtained, and the speed change ratio is controlled according to the target speed change ratio. Based on the basic speed change ratio and the target speed change ratio, furthermore, a rate of progress in the change of speed is operated according to rate of progress=1—(|basic speed change ratio—target speed change ratio|)/basic speed change ratio. Based on the rate of progress and the throttle opening degree, the up-shift is discriminated to be in any one of a first up-shift mode where the throttle opening degree is maintained constant, a second up-shift mode where the throttle is fully closed or a third up-shift mode where the throttle is closed to a half opened state to shift the acceleration to a steadily traveling state. Different rates of changing the speed are set for these up-shift modes.

14 Claims, 5 Drawing Sheets

FIG.5

APPARATUS FOR CONTROLLING A CONTINUOUSLY VARIABLE TRANSMISSION AND METHOD THEREOF

BACKGROUND OF THE INVENTION

1. Field of the Invention

The present invention relates to an apparatus for controlling a speed change ratio of a continuously variable transmission for a vehicle and to a method thereof. Particularly, the invention relates to technology for optimizing a rate of changing the speed.

2. Related Art of the Invention

Methods of controlling a rate of changing the speed of a continuously variable transmission have heretofore been proposed as disclosed in, for example, Japanese Unexamined Patent Publications Nos. 62-149526 and 8-74958.

According to the method of Japanese Unexamined Patent Publication No. 62-149526, a rate of changing the speed is calculated based upon a deviation between a target speed change ratio and an actual speed change ratio.

According to the method of Japanese Unexamined Patent Publication No. 8-74958, the up-shift is discriminated to be an up-shift in a state where the throttle opening degree remains nearly constant and an up-shift accompanying a change in the throttle opening degree, and the up-shift control operation is carried out at different rates of changing the speed.

Even when the deviation between the target speed change ratio and the actual speed change ratio remains the same, however, the speed must be changed at a different rate depending upon whether the deviation is taking place on the side (high-gear side) of a large speed change ratio (in this invention, the speed change ratio=output rotational speed/input rotational speed) or is taking place on the side (low-gear side) of a small speed change ratio. With the constitution in which the rate of changing the speed is set depending simply upon the target speed change ratio and the actual speed change ratio, therefore, it is difficult to change the speed at an optimum rate of changing the speed.

Even in the same up-shift operation accompanying a change in the throttle opening degree, furthermore, the speed must be changed at a different rate depending upon an up-shift of when the throttle valve is brought to a nearly fully closed state from the open state in an attempt to effect the deceleration and an up-shift of when the throttle valve is closed to a half opened state which is smaller than that of during the acceleration in an attempt to shift the acceleration to a steadily traveling state. So far, however, the speed has been changed at the same rate for these up-shifts; i.e., the up-shift operation is not effected at a proper rate of changing the speed.

Similarly, even during the down-shift operation, the speed must be changed at a different rate depending upon a down-shift of when the throttle valve is opened in an attempt to execute acceleration and a down-shift that is effected accompanying a drop in the vehicle speed. So far, however, the down-shift operation has not been effected at such a requested rate of changing the speed.

SUMMARY OF THE INVENTION

The present invention was accomplished in view of the above-mentioned problems, and its object is to set a suitable rate of changing the speed depending upon a speed change ratio range where it has been requested to change the speed.

Another object of the invention is to set a suitable rate of changing the speed by properly discriminating the up-shift and the down-shift by taking into consideration of a difference in the request for a rate of changing the speed.

In order to accomplish the above-mentioned objects according to the apparatus and method of controlling a continuously variable transmission of the present invention, a target speed change ratio is operated that follows a basic speed change ratio depending upon the operation conditions at a predetermined rate of changing the speed, and a speed change ratio of the continuously variable transmission is so controlled as to reach the target speed change ratio, wherein the change of speed is discriminated to be any one of plural kinds of change-of-speed modes based on a rate of progress in the change of speed operated based upon the basic speed change ratio and the target speed change ratio, and the target speed change ratio is operated by changing the rate of changing the speed for each of the discriminated change-of-speed modes.

According to this constitution, the rate of changing the speed is changed based upon the rate of progress in the change of speed, and the speed can be changed at a different rate depending upon the basic speed change ratio at that moment even when the deviation remains the same between the basic speed change ratio and the target speed change ratio. Therefore, the speed can be controlled depending upon a different request for a rate of changing the speed that stems from a difference in the speed change ratio range.

Here, it is preferable that the change of speed is discriminated to be either the up-shift or the down-shift based upon the basic speed change ratio and the target speed change ratio, and when the change of speed is discriminated to be the up-shift, the up-shift is discriminated to be any one of preset plural kinds of change-of-speed modes based upon the rate of progress and the throttle opening degree.

According to this constitution, the speed is so changed that the target speed change ratio (actual speed change ratio) is brought to the basic speed change ratio. It is therefore allowed to discriminate whether the change of speed is the up-shift or the down-shift by comparing the basic speed change ratio with the target speed change ratio. Even during the same up-shift operation, furthermore, a change in the basic speed change ratio is determined by taking a speed change ratio range into consideration. Besides, whether the up-shift operation is under the condition where deceleration is required or under the condition where steady traveling is required, can be estimated based upon the throttle opening degree, and thus the up-shift operation can be executed at a suitable rate of changing the speed.

It is further preferable that the up-shift is discriminated to be any one of a first up-shift mode in which the rate of progress is larger than a predetermined value, a second up-shift mode in which the rate of progress is at least smaller than the predetermined value and the throttle valve is fully closed or a third up-shift mode in which the rate of progress is at least smaller than the predetermined value and the throttle valve is closed to a half opened state.

According to this constitution, the case where the throttle opening degree does not almost change and the basic speed change ratio gradually changes toward the up-shift direction due to a change in the vehicle speed, is discriminated to be the first up-shift mode. Furthermore, the change of speed accompanying the throttle operation is discriminated to be the up-shift when the rate of progress is relatively large and, besides, the up-shift accompanying the throttle operation is discriminated to be either in the second up-shift mode or in the third up-shift mode based upon whether the throttle valve is fully closed or not. The up-shift operation is effected at a suitable rate of changing the speed according to any one of the first to third up-shift modes.

In discriminating the change-of-speed mode to which the up-shift corresponds, it is preferable that the second up-shift mode and the third up-shift mode are discriminated based upon different rates of progress.

According to this constitution, the width of change in the basic speed change ratio differs depending upon when the throttle valve is fully closed in an attempt to effect the deceleration and when the throttle valve is closed to a half opened state in an attempt to shift the acceleration into a steadily traveling state. Therefore, the second up-shift mode and the third up-shift mode are properly discriminated depending upon a difference in the driver's intention. It is preferable that a rate of progress for discriminating the up-shift to be in the second up-shift mode is set to be smaller than a rate of progress for discriminating the up-shift to be in the third up-shift mode.

It is further preferable that the change of speed is discriminated to be either the up-shift or the down-shift based on the basic speed change ratio and the target speed change ratio and, when the change of speed is discriminated to be the down-shift, the down-shift is discriminated to be in any one of preset plural kinds of change-of-speed modes based on the rate of progress.

According to this constitution, the speed is so changed that the target speed change ratio (actual speed change ratio) is brought to the basic speed change ratio. It is therefore allowed to discriminate whether the change of speed is the up-shift or the down-shift by comparing the basic speed change ratio with the target speed change ratio. Besides, even during the same down-shift operation, a change in the basic speed change ratio is determined by taking a speed change ratio range into consideration and the rate of changing the speed is changed, so that the down-shift operation can be executed at a suitable rate of changing the speed.

It is preferable that the down-shift is discriminated to be either in a first down-shift mode in which the rate of progress is larger than a predetermined value or in a second down-shift mode in which the rate of progress is smaller than the predetermined value.

According to this constitution, even during the same down-shift operation, the request for the down-shift may stem from the operation for opening the throttle valve or the request for the down-shift may stem from a drop in the vehicle speed. When the down-shift operation is requested accompanying the operation for opening the throttle valve, the basic speed change ratio changes relatively sharply. Therefore, this may be regarded to be a state where the rate of progress is smaller than the predetermined value and may be distinguished from the down-shift operation accompanying a drop in the vehicle speed. Therefore, the speed can be changed at a suitable rate depending upon the down-shift operation accompanying the driver's intention for acceleration and the down-shift operation accompanying a drop in the vehicle speed.

It is further preferable that the rate of changing the speed is returned back to the reference rate when the rate of progress becomes equal to or greater than the predetermined value.

According to this constitution, when the rate of progress becomes equal to or larger than a predetermined value and it is discriminated that the target speed change ratio (actual speed change ratio) has approached a change in the basic speed change ratio to a sufficient degree, i.e., when it is discriminated that the change of speed is nearly terminated, the rate of changing the speed depending upon the change-of-speed mode until then is returned back to the reference rate, in order to prevent hunting in the actual speed change ratio near the basic speed change ratio.

It is further preferable that the rate of progress in the change of speed is operated according to, Rate of progress= 1—(|basic speed change ratio—target speed change ratio|)/ basic speed change ratio According to this constitution, the speed change ratio= output rotational speed/input rotational speed. Therefore, even when the value |basic speed change ratio—target speed change ratio| remains the same, the rate of progress is calculated to be a large value and a change in the basic speed change ratio is evaluated to be small on the high-gear side and the change in the basic speed change ratio is evaluated to be large on the low-gear side. Therefore, a relatively large rate of changing the speed is set on the high-gear side, so that the driver will not feel it offensive yet exhibiting a -maximum degree of convergence.

Other objects and features of the present invention will become obvious from the following description of the embodiments in connection with the accompanying drawings.

PREFERRED EMBODIMENT

An embodiment of the invention will now be described.

Figure 1:
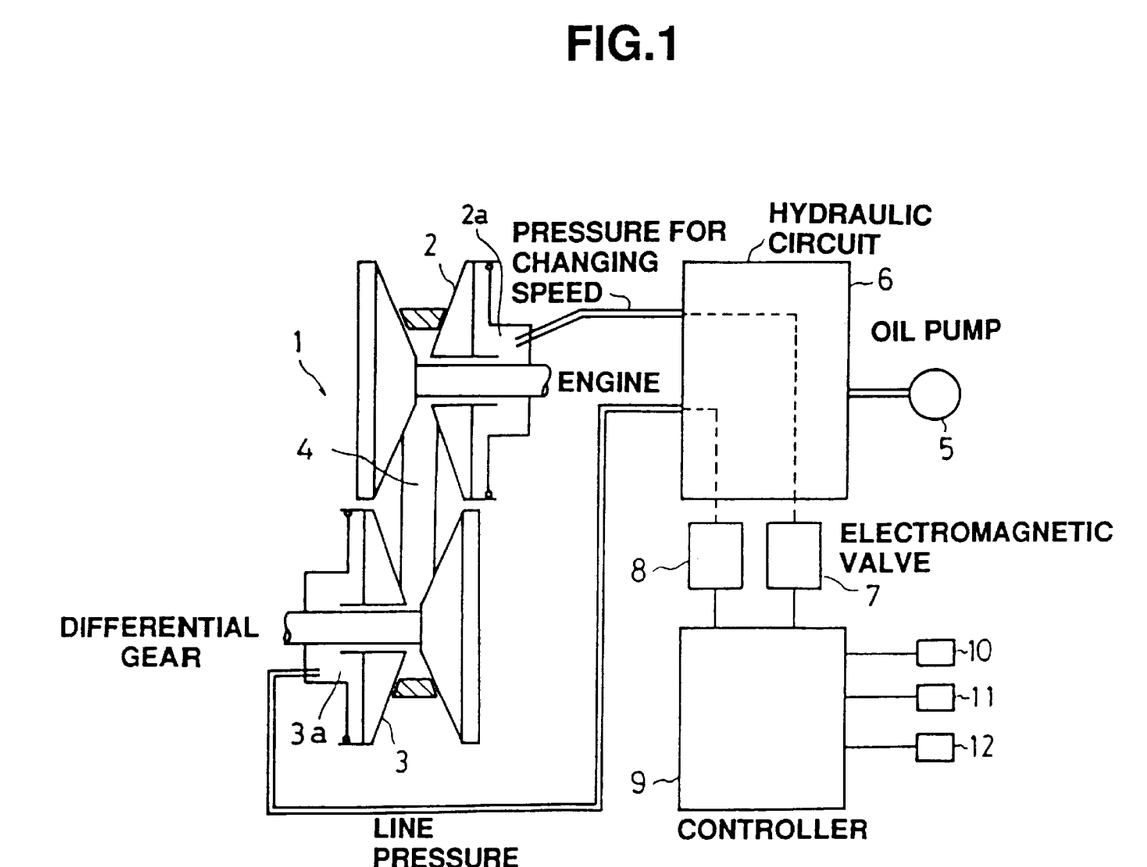
FIG. 1 is a diagram illustrating a system of a continuously variable transmission according to an embodiment of the present invention.

FIG. 1 is a diagram illustrating the constitution of a system of a continuously variable transmission, wherein the continuously variable transmission 1 for vehicles that is combined with an engine that is not shown, comprises a primary pulley 2 of the engine side, a secondary pulley 3 of the drive shaft (differential gear) side and a belt 4 connected between them, wherein a pulley ratio is changed to steplessly change a speed change ratio by adjusting the pressure for changing the speed of an actuator 2a on the side of the primary pulley and adjusting the line pressure to an actuator 3a on the side of the secondary pulley. Here, the continuously variable transmission may have any other structure such as of the toroidal type.

The pressure for changing the speed and the line pressure are adjusted by being controlled by electromagnetic valves 7 and 8 having a function for relieving the hydraulic pressure of a hydraulic circuit 6 connected to an oil pump 5, the electromagnetic valves 7 and 8 being controlled by a controller 9.

Therefore, the electromagnetic valves 7 and 8 are controlled by the controller 9 thereby to control the pressure for changing the speed and the line pressure, in order to steplessly control the speed change ratio.

In order to control the speed change ratio, the controller 9 receives detection signals from a vehicle speed sensor 10 for detecting the vehicle speed VSP, from a throttle sensor 11 for detecting the opening degree TVO of a throttle valve that is opened and closed being interlocked to an accelerator pedal that is operated by a driver, and from an engine rotation sensor 12 for detecting the rotational speed Ne of the engine.

The controller 9 containing a microcomputer sets a basic speed change ratio that corresponds to a steadily traveling state based upon these signals, sets a target speed change ratio which follows the basic speed change ratio at a predetermined rate of changing the speed, and feedback controls the electromagnetic valves 7 and 8 so that an actual speed change ratio is brought into agreement with the target speed change ratio, thereby to control the change of speed.

Concretely speaking, a basic speed change ratio requested under the operation conditions is set based upon the vehicle speed VSP and the throttle opening degree TVO. When there is a deviation between the basic speed change ratio and the target speed change ratio, the target speed change ratio is stepwisely changed by each predetermined amount so as to be gradually brought to the basic speed change ratio. The electromagnetic valves 7 and 8 are feedback controlled so that the actual speed change ratio of the transmission obtained from the rotational speed Ne of the engine and the vehicle speed VSP (rotational speed of the output shaft of the transmission) is brought to the target speed change ratio.

Therefore, the rate of changing the speed is determined by a unit amount by which the target speed change ratio is stepwisely changed toward the basic speed change ratio.

Figure 2:
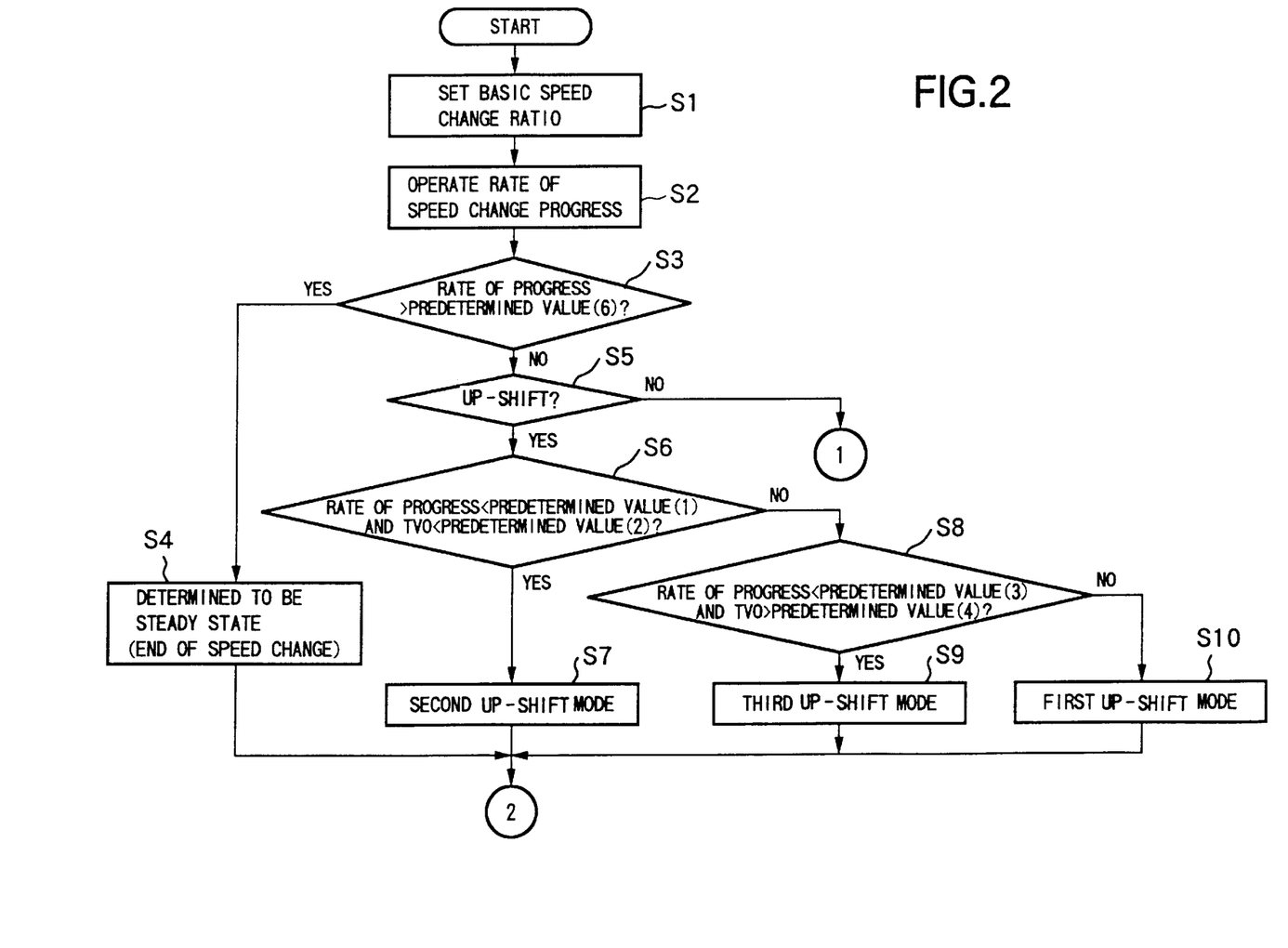
FIG. 2 is a flow chart illustrating how to control the change of speed according to the embodiment.
Figure 3:
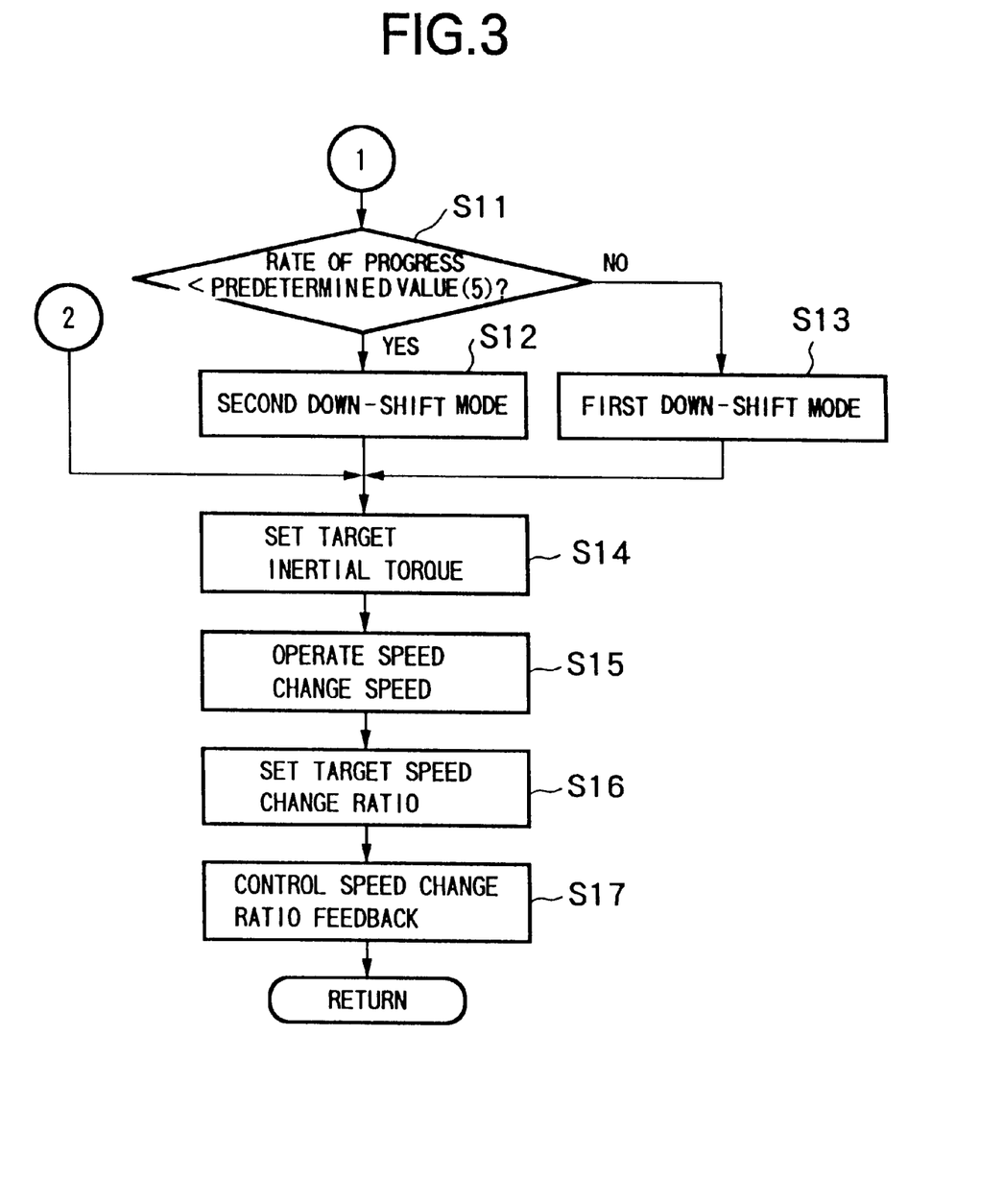
FIG. 3 is a flow chart illustrating how to control the change of speed according to the embodiment.

Controlling the change of speed will now be described with reference to flow charts of FIGS. 2 and 3.

At step 1 (denoted by Si in the drawings, the same holds hereinafter), a basic speed change ratio BASE corresponding to the present vehicle speed VSP and to the throttle opening degree TVO is obtained by making reference to a map storing basic speed change ratios $i_{base}$ for each of the lattices sectionalized in advance depending upon the vehicle speed VSP and the throttle opening degree TVO (means for setting a basic speed change ratio).

At step 2, a rate of progress in the change of speed is operated from the present target speed change ratio $i_{tgt}$ and the basic speed change ratio $i_{base}$ set at step 1 in a manner as described below (means for operating the rate of progress).

Rate of progress=1—(|basic speed change ratio—target speed change ratio|)/basic speed change ratio.

Here, the speed change ratio=output rotational speed/input rotational speed.

At step 3, it is discriminated whether the steadily traveling state is being assumed or the change of speed is to be just terminated relying upon whether the rate of progress is equal to or larger than a predetermined value (6) (>predetermined values (1), (3), (5)) or not. When the rate of progress is equal to or larger than the predetermined value, the routine proceeds to step 4 where the steadily traveling state is discriminated, and the routine proceeds to step 14.

During the transient period in which the rate of progress is smaller than the predetermined value, the routine proceeds to step 5 where it is discriminated whether the change of speed is the up-shift or the down-shift based upon the comparison of the target speed change ratio $i_{tgt}$ with the basic speed change ratio $i_{base}$ (means for discriminating up-shift and down-shift). Here, the change of speed is the down-shift when the basic speed change ratio $i_{base}$ is smaller than the target speed change ratio $i_{tgt}$ and, conversely, the change of speed is the up-shift when the basic speed change ratio $i_{base}$ is larger than the target speed change ratio $i_{tgt}$.

When it is discriminated at step 5 that the change of speed is the up-shift, the routine proceeds to step 6 where it is discriminated whether the rate of progress is smaller than the predetermined value (1) and the throttle opening degree TVO is smaller than the predetermined value (2).

The rate of progress becomes a smaller value when the deviation is large between the target speed change ratio $i_{tgt}$ and the basic speed change ratio $i_{base}$, in other words, when the basic speed change ratio $i_{base}$ has greatly changed in a stepwise manner.

Therefore, whether or not the basic speed change ratio $i_{base}$ has greatly and stepwisely changed by equal to or greater than a predetermined value is discriminated by discriminating whether the rate of progress is smaller than a predetermined value (1) or not. When it is recognized based upon the rate of progress that the basic speed change ratio $i_{base}$ has changed by more than the predetermined value and when the throttle opening degree at that moment is in the fully closed state which is smaller than the predetermined value (2), it is so determined that the change of speed is the up-shift (hereinafter referred to as a second up-shift mode) accompanying the driver's operation for fully closing the throttle valve from an open state in an attempt to effect deceleration. In this case, therefore, the routine proceeds to step 7 where the second up-shift mode is set as a kind of the up-shift.

When it is discriminated at step 6 that the rate of progress is equal to or larger than the predetermined value (1) and/or the throttle opening degree TVO is equal to or larger than the predetermined value (2), the routine proceeds to step 8.

At step 8, it is discriminated whether the rate of progress is smaller than the predetermined value (3) (>predetermined value (1)) and the throttle opening degree TVO is in excess of the predetermined value (4) (>predetermined value (2)) or not.

The predetermined value (3) is set as a value larger than the predetermined value (1), so that the state where the acceleration with the throttle valve being closed by a relatively small amount (width of change in the basic speed change ratio is small) is shifted to the steadily traveling state, can be discriminated maintaining good precision in contrast with that of the deceleration operation where the throttle valve is nearly fully closed.

The predetermined value (4) has been set to be larger than the predetermined value (3) to make it possible to discriminate the intention of the driver who wishes to shift the acceleration to the steadily traveling state without fully closing the throttle valve.

When it is discriminated at step 8 that the rate of progress is smaller than the predetermined value (3) and the throttle opening degree TVO is in excess of the predetermined value (4), it is so determined that the change of speed is the up-shift (hereinafter referred to as a third up-shift mode) accompanying the driver's operation for closing the throttle valve to a half opened state smaller than that of during the acceleration in an attempt to shift the acceleration to the steadily traveling state. In this case, the routine proceeds to step 9 where the third up-shift mode is set as a kind of the up-shift.

When it is discriminated at step 8 that the rate of progress is equal to or larger than the predetermined value (3) and/or the throttle opening degree TVO is equal to or smaller than the predetermined value (4), i.e., when the shift up is neither in the second up-shift mode nor in the third up-shift mode, it is determined that the change of speed is the shift up (hereinafter referred to as the first up-shift mode) accompanying an increase in the vehicle speed VSP in a state where the throttle opening degree remains nearly constant. Then, the routine proceeds to step 10 where the first up-shift mode is set as a kind of the up-shift.

The above-mentioned steps 5 to 10 correspond to an up-shift mode discrimination means.

When it is discriminated at step 5 that the change of speed is the down-shift based upon the comparison of the target speed change ratio $i_{tgt}$ with the basic speed change ratio $i_{base}$, the routine proceeds to a step 11.

At step 11, the rate of progress is compared with a predetermined value (5).

When the rate of progress is smaller than the predetermined value (5), it is determined that the change of speed is the down-shift (hereinafter referred to as a second down-shift mode) accompanying the driver's operation for opening the throttle valve, and the routine proceeds to step 12 where the second down-shift mode is set as a kind of the down-shift.

When it is discriminated at step 11 that the rate of progress is equal to or larger than the predetermined value (5), it is determined that the change of speed is the down-shift (hereinafter referred to as a first down-shift mode) accompanying a drop in the vehicle speed VSP, and the routine proceeds to a step 13 where the first down-shift mode is set as a kind of the down-shift.

The above-mentioned steps 5 and 11 to 13 correspond to a down-shift mode discrimination means, and the above-mentioned steps 5 to 12 correspond to a change-of-speed mode discrimination means.

Even when the absolute value of deviation between the basic speed change ratio and the target speed change ratio remains the same, the rate of progress is set to be large on the high-gear side where the basic speed change ratio is large. On the high-gear side, therefore, the change of speed is easily discriminated to be the first up-shift mode or the first down-shift mode. In the first up-shift mode or the first down-shift mode as will be described later, a relatively large rate of changing the speed is set. Even when the absolute value of deviation remains the same between the basic speed change ratio and the target speed change ratio, a large rate of changing the speed tends to be allowed at the high-gear side. Therefore, the speed can be changed at a maximum rate of changing the speed maintaining good convergence without causing the driver to feel it offensive.

When the shifting condition is discriminated as described above, step 14 sets a target inertial torque at the time of shifting that is used for operating the rate of changing the speed.

It is preferable that the target inertial torque increases with an increase in, for example, the engine torque. In this embodiment, furthermore, the target inertial torque is set to a different value depending upon the result of discriminating the shifting condition even when the engine torque remains the same.

Concretely speaking, at the time of up-shift, the target inertial torques are set maintaining a relationship of first up-shift mode>third up-shift mode>second up-shift mode, so that the greatest target inertial torque is set during the first up-shift mode and that the up-shift is effected at the greatest rate of changing the speed (means for changing the rate of changing the speed).

In the first up-shift mode where the basic speed change ratio gradually changes, a relatively large rate of changing the speed is given as described above to maintain convergence to the basic speed change ratio so as not to create rev-up feeling. In the second up-shift mode, a request for down-shift is produced due to a drop in the vehicle speed after the throttle valve is fully closed. Therefore, a relatively small rate of changing the speed is given so as not to create rush-out feeling.

In the third up-shift mode, furthermore, the basic speed change ratio changes stepwisely. Therefore, when a rate of changing the speed which is as relatively large as that of the first up-shift mode is given, the rotational speed sharply decreases to create offensive feeling (see FIG. 4). Conversely, when a relatively small rate of changing the speed is given that meets the second up-shift mode, the rotational speed does not decrease despite the throttle valve is closed causing the driver to feel it offensive (see FIG. 5). It is therefore preferred to give a rate of changing the speed between that of the first up-shift mode and that of the second up-shift mode.

Figure 4:
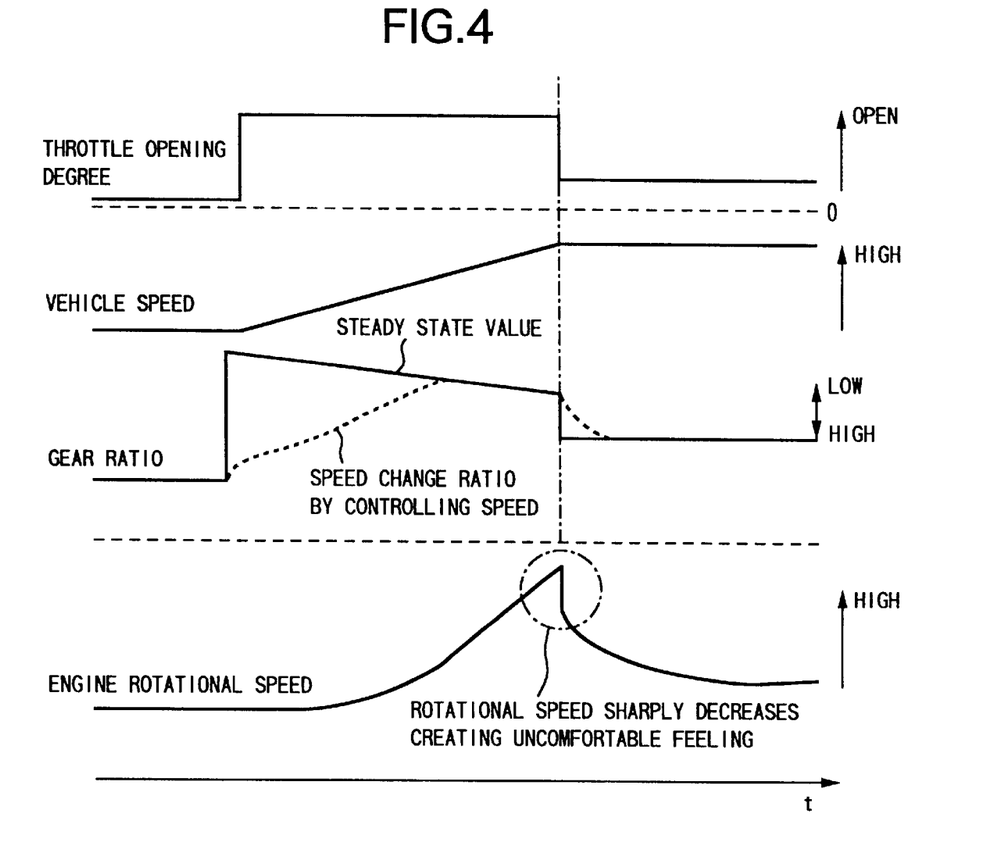
FIG. 4 is a time chart illustrating the characteristics of when the rate of changing the speed is too large with the throttle being so operated as to shift the acceleration into a steadily traveling state.
Figure 5:
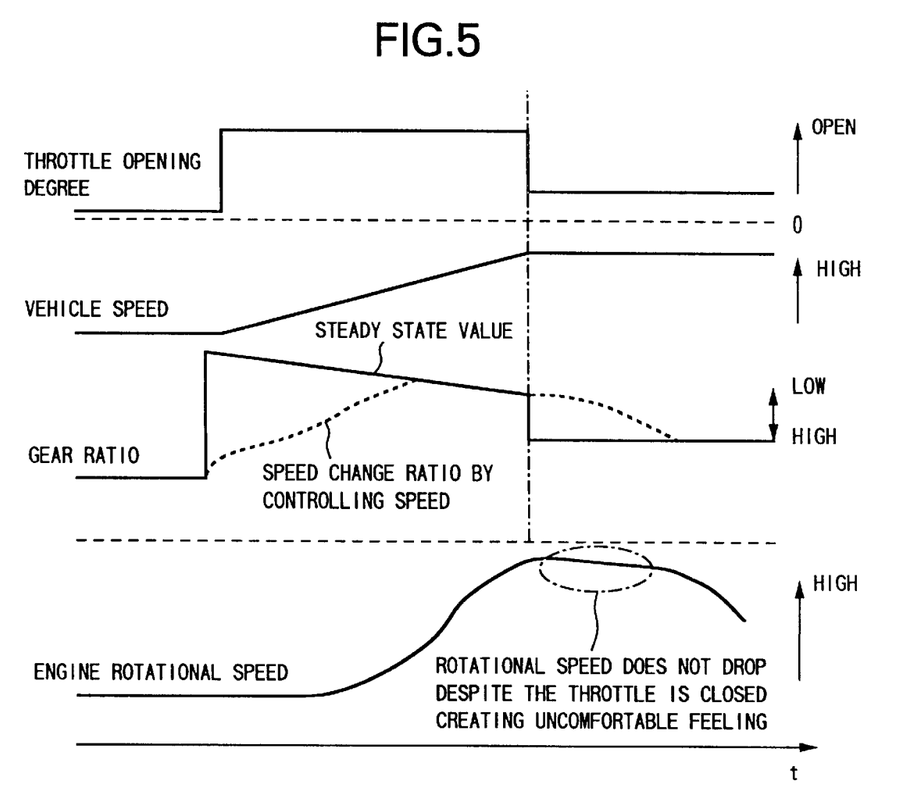
FIG. 5 is a time chart illustrating the characteristics of when the rate of changing the speed is too small with the throttle being so operated as to shift the acceleration into the steadily traveling state.

Referring to FIGS. 4 and 5, the gear ratio=1/speed change ratio.

At the time of down-shift, furthermore, the target inertial torques are so set as to establish such a relationship of first down-shift mode>second down-shift mode, so that a larger target inertial torque is set in the first down-shift mode than in the second down-shift mode and that the down-shift is executed at a larger rate of changing the speed (means for changing the rate of changing the speed).

This makes it possible to avoid a sharp increase in the rotational speed at the time of acceleration where the pedal is depressed and to maintain the convergence of speed change ratio at the time of deceleration.

Here, it is preferable that the target inertial torque (rate of changing the speed) during the first up-shift mode is nearly equal to the target inertial torque (rate of changing the speed) during the first down-shift mode.

It is preferable that, after the target inertial torque (rate of changing the speed) is set depending upon the first up-shift mode, second up-shift mode, third up-shift mode, first down-shift mode or second down-shift mode, when the change of speed progresses and the rate of progress in the change of speed becomes larger than a predetermined value and the traveling state is determined to be steady at step 4, the target inertial torque is set to be nearly equal to that of the second up-shift mode or smaller than that of the second up-shift mode, so that the rate of changing the speed is set to a relatively small reference rate (means for returning the rate of changing the speed), in order to avoid hunting in the target speed change ratio (actual speed change ratio) near the basic speed change ratio.

The engine torque can be estimated based on the throttle valve opening degree TVO and the rotational speed Ne of the engine. The method of setting the target inertial torque is in no way limited to the above-mentioned method only but may be the one based upon a deviation between an actual speed change ratio and the basic speed change ratio, the one based upon a deviation between the present vehicle drive force and a vehicle drive force of when the speed change ratio is controlled to acquire the basic speed change ratio, the one based upon a rate of changing the basic speed change ratio, or the one based upon a rate of change in the vehicle drive force. What is important here is that the target inertial torque set by any one of these methods maintains the above-mentioned relationship that varies depending at least upon each kind of the shift.

When a target inertial torque is set, an amount of step change SV corresponding to the rate of changing the speed is set at step 15 based upon an actual speed change ratio i (=rotational speed of the output shaft/rotational speed of the engine) obtained from the rotational speed of the engine (input rotational speed) and the rotational speed of the output shaft of the transmission (output rotational speed), rotational speed No of the output shaft of the transmission, the above-mentioned target inertial torque TTINR, and inertial torque IE of the engine given as a constant, in compliance with the formula SV=TTINR/(i×IE×No).

According to the above formula, the amount of step change, in other words, the rate of changing the speed is set to be larger with an increase in the target inertial torque.

According to the above formula, furthermore, the rate of changing the speed changes depending upon the vehicle speed (rotational speed No of the output shaft). In particular, the rate of changing the speed decreases toward the side of higher vehicle speed, making it possible to set the inertial torque constant at the time of changing the speed.

Even when the third up-shift mode is shifted to the first up-shift mode, the amount of step change for determining the rate of changing the speed is not changed at one time from a value that meets the third up-shift mode to a value that meets the first up-shift mode, but is gradually changed to a value that meets the first up-shift mode. Besides, the rate of changing the speed of the amount of step change may be different for each kind of the mode shifting.

After the amount of step change for determining the rate of changing the speed is calculated, the routine proceeds to a step 16 where the target speed change ratio $i_{tgt}$ is changed by the amount of step change SV toward a direction to approach the basic speed change ratio $i_{base}$, and the target speed change ratio $i_{tgt}$ is updated (means for setting a target speed change ratio).

At step 17, the actual speed change ratio i is feedback controlled to come into agreement with the target speed change ratio $i_{tgt}$ (means for controlling the speed change ratio).

In the above-mentioned embodiment, the down-shift was discriminated to be either one of the two kinds, i.e., either the first down-shift mode or the second down-shift mode based upon the comparison of the rate of progress with the predetermined value (3). The down-shift, however, may be discriminated to be any one of the three or more kinds based upon the comparison of a plurality of different predetermined values with the rate of progress. Moreover, the up-shift was discriminated by using the rate of progress as well as the throttle opening degree. It is, however, also allowable to discriminate the up-shift to be any one of two or more kinds based upon the rate of progress only.

In the foregoing description, furthermore, the target inertial torque was set for every mode of changing the speed. It is, however, also allowable to set a fixed rate of changing the speed for every mode of changing the speed and to directly set a rate of changing the speed relying upon the result of discriminating the mode for changing the speed.

It is further allowable to impart hysteresis characteristics in discriminating the rate of progress and the throttle opening degree TVO.

What I claimed is:

1. An apparatus for controlling a continuously variable transmission comprising:

basic speed change ratio setting means for setting a basic speed change ratio depending upon the operation conditions;

target speed change ratio setting means for setting a target speed change ratio that follows said basic speed change ratio at a predetermined rate of changing the speed;

speed change ratio control means for controlling a speed change ratio of the continuously variable transmission according to said target speed change ratio;

rate-of-progress operation means for operating a rate of progress in the change of speed based upon said basic speed change ratio and said target speed change ratio;

up-down discrimination means for discriminating the change of speed to be either the up-shift or the down-shift based upon said basic speed change ratio and said target speed change ratio;

up-shift mode discrimination means for discriminating the up-shift to be in any one of a first up-shift mode where the rate of progress is larger than a predetermined value, a second up-shift mode where the rate of progress is at least smaller than said predetermined value and the throttle is fully closed, or a third up-shift mode where the rate of progress is at least smaller than said predetermined valued and the throttle is closed to a half opened state, when the up-shift is discriminated by said up-down discrimination means; and rate-of-changing-the-speed changing means for changing the rate of changing the speed of said target speed change ratio setting means for every up-shift mode discriminated by said up-shift mode discrimination means.

2. An apparatus for controlling a continuously variable transmission according to claim 1, wherein said up-shift mode discrimination means discriminates said second up-shift mode and said third up-shift mode by setting different rates of progress as reference.

3. An apparatus for controlling a continuously variable transmission according to claim 1, further comprising a rate-of-changing-the-speed return means for returning said rate of changing the speed to a reference rate when said rate of progress becomes equal to or greater than a predetermined value.

4. An apparatus for controlling a continuously variable transmission according to claim 1, wherein said rate-of-progress operation means operates the rate of progress in the change of speed according to, Rate of progress=1—(|basic sped change ratio—target speed change ratio|)/basic speed change ratio.

5. An apparatus for controlling a continuously variable transmission comprising:

basic speed change ratio setting means for setting a basic speed change ratio depending upon the operation conditions;

target speed change ratio setting means for setting a target speed change ratio that follows said basic speed change ratio at a predetermined rate of changing the speed;

speed change ratio control means for controlling a speed change ratio of the continuously variable transmission according to said target speed change ratio;

rate-of-progress operation means for operating a rate of progress in the change of speed based upon said basic speed change ratio and said target speed change ratio;

up-down discrimination means for discriminating the change of speed to be either the up-shift or the down-shift based upon said basic speed change ratio and said target speed change ratio;

down-shift mode discrimination means for discriminating the down-shift to be in either a first down-shift mode where the rate of progress is larger than a predetermined value, or a second down-shift mode where the rate of progress is smaller than said predetermined value, when the down-shift is discriminated by said up-down discrimination means; and rate-of-changing-the-speed changing means for changing the rate of changing the speed of said target speed change ratio setting means for every down-shift mode discriminated by said down-shift mode discrimination means.

6. An apparatus for controlling a continuously variable transmission according to claim 6 further comprising rate-of-changing-the-speed returning means for returning said rate of changing the speed to a reference rate when said rate of progress becomes equal to or greater than a predetermined value.

7. An apparatus for controlling a continuously variable transmission according to claim 6, wherein said rate-of-progress operating means operates the rate of progress in the change of speed according to Rate of progress=1—(|basic change speed ratio—target speed change ratio|)/basic speed change ratio.

8. A method of controlling a continuously variable transmission comprising:

operating a target speed change ratio that follows a basic speed change ratio depending upon the operation conditions at a predetermined rate of changing the speed;

controlling a speed change ratio of the continuously variable transmission according to said target speed change ratio;

operating a rate of progress in the change of speed based upon said basic speed change ratio and said target speed change ratio;

discriminating the change of speed to be either the up-shift or the down-shift based upon said basic speed change ratio and said target speed change ratio;

discriminating the up-shift to be in any one of the first up-shift mode where the rate of progress is larger than a predetermined value, a second up-shift mode where the rate of progress is at least smaller than said predetermined value and the throttle is filly closed, or a third up-shift mode where the rate of progress is at least smaller than said predetermined value and the throttle is closed to a half opened state, when the up-shift is discriminated; and changing said rate of changing the speed for every said discriminated up-shift mode.

9. A method of controlling a continuously variable transmission according to claim 8, wherein said second up-shift mode and said third up-shift mode are discriminated by setting different rates of progress as reference.

10. A method of controlling a continuously variable transmission according to claim 11, further comprising returning said rate of changing the speed to a reference rate when said rate of progress becomes equal to or greater than a predetermined value.

11. A method of controlling a continuously variable transmission according to claim 8, wherein said rate of progress in the change of speed is operated according to, Rate of progress=1—(|basic change speed ratio—target speed change ratio|)/basic speed change ratio.

12. A method of controlling a continuously variable transmission comprising:

operating a target speed change ratio that follows a basic speed change ratio depending upon the operation conditions at a predetermined rate of changing the speed;

controlling a speed change ratio of the continuously variable transmission according to said target speed change ratio;

operating a rate of progress in the change of speed based upon said basic speed change ratio and said target speed change ratio;

discriminating the change of speed to be either the up-shift or the down-shift based upon said basic speed change ratio and said target speed change ratio;

discriminating the down-shift to be in either a first down-shift mode where the rate of progress is larger than a predetermined value or a second down-shift mode where the rate of progress is smaller than said predetermined value, when the down-shift is discriminated; and changing said rate of changing the speed for every said discriminated down-shift mode.

13. A method of controlling a continuously variable transmission according to claim 12, further comprising returning said rate of changing the speed to a reference rate when said rate of progress becomes equal to or greater than a predetermined value.

14. A method of controlling a continuously variable transmission according to claim 12, wherein said rate of progress in the change of speed is operated according to, Rate of progress—1—(|basic change speed ratio—target speed change ratio|)/basic speed change ratio.

* * * * *